(12) United States Patent
Wheatley

(10) Patent No.: US 6,983,031 B2
(45) Date of Patent: Jan. 3, 2006

(54) FRAME SYNCHRONIZATION IN DATA COMMUNICATION SYSTEM

(75) Inventor: Timothy John Wheatley, Crowthorne (GB)

(73) Assignee: Agere Systems Inc., Allentown, PA (US)

(*) Notice: Subject to any disclaimer, the term of this patent is extended or adjusted under 35 U.S.C. 154(b) by 746 days.

(21) Appl. No.: 09/946,719

(22) Filed: Sep. 5, 2001

(65) Prior Publication Data

US 2002/0075979 A1    Jun. 20, 2002

(30) Foreign Application Priority Data

Sep. 18, 2000    (EP) .................... 00308080

(51) Int. Cl.
 *H04L 7/00*    (2006.01)
(52) U.S. Cl. .................... 375/368
(58) Field of Classification Search ........ 375/365–368, 375/354, 355, 362
 See application file for complete search history.

(56) References Cited

U.S. PATENT DOCUMENTS

| | | | | |
|---|---|---|---|---|
| 4,847,877 A | * | 7/1989 | Besseyre | .................... 375/368 |
| 5,111,454 A | * | 5/1992 | Hung et al. | .................. 370/337 |
| 5,495,498 A | | 2/1996 | Tominaga | .................... 375/200 |
| 6,396,866 B1 | * | 5/2002 | Upton et al. | ................. 375/139 |

FOREIGN PATENT DOCUMENTS

| | | |
|---|---|---|
| EP | 0618728 A | 10/1994 |
| EP | 0942569 A | 9/1999 |

OTHER PUBLICATIONS

Jim Butler, "UARTs make possible low-cost networks of embedded systems",EDN Electrical Design News, vol. 40, No. 7, Mar. 30, 1995, pp. 87-92, 94, 96.
"Packet Delineation Format On High Speed Trunks", IBM Technical Disclosure Bulletin, vol. 38, No. 9, Sep. 1, 1995, pp. 143-146.

* cited by examiner

*Primary Examiner*—Kevin Burd

(57) ABSTRACT

In order to provide a simple and reliable means of frame synchronization in a serial data communication system, which avoids the problem of 'bit-stuffing' in known HDLC systems, the data communication system comprises a transmitter arranged to transmit data as a sequence of frames, each frame comprising a synchronization section and a payload section of data, and the transmitter including in the synchronization section of each frame a count value of a sequence of count values (a part of a predetermined code sequence), wherein successive frames contain successive count values (other parts of the predetermined code sequence) The receiver includes a FIFO buffer for storing three successively received frames, and a processor for assessing the stored data within the frames in order to locate and recognize the count values, whereby to synchronize to the received frames.

18 Claims, 3 Drawing Sheets

FRAME SYNCHRONIZATION IN DATA COMMUNICATION SYSTEM

CROSS-REFERENCE TO RELATED APPLICATION

This application claims priority of European Patent Application No. 00308080.1, which was filed on Sep. 18, 2000.

BACKGROUND OF THE INVENTION

The present invention relates to a data communication system, particularly though not exclusively a serial data communication system, and relates to a protocol or method for a data communication system.

Many serial data communication systems have protocols requiring some method of delimiting frames of data and control information. In general, serial data links use limited interconnect (i.e., a limited number of wires or lines) and cannot tolerate the addition of a hardware frame synchronisation signal on a separate hardware line. Hence, some form of frame delimiting data sequence is required to provide frame synchronisation. When the data and control information is binary coded, so that any value can occur, the definition of a unique delimiting sequence is difficult.

HDLC (High-Level Data Link Control) is an example of a serial data communication system which transmits data in delimited frames or packets. It is a bit-oriented protocol that permits frames containing an arbitrary number of bits. HDLC employs a frame or packet structure comprising a sequence of:

Header flag bit pattern, 01111110

Address field—to identify receiving terminal or to distinguish commands from responses.

Control field—for sequence numbers, acknowledgements, etc.

Data field—arbitrarily long.

Checksum field—CRC.

Delimiting flag bit pattern, 01111110

Thus, HDLC uses a sequence of flag bits to delimit a frame of data. 'Bit-stuffing' is employed to ensure that the synchronisation sequence never occurs in the random binary data being transferred. Whenever the transmitting hardware encounters five consecutive ones in the data, it automatically stuffs a 0 bit in the outgoing bit stream. When the receiver sees five consecutive incoming bits, followed by a 0 bit, it automatically selects the 0 bit. Generally, the 'bit-stuffing' process is software intensive and tends to be done by special hardware.

SUMMARY OF THE INVENTION

It is an object of the present invention to provide a data communication system with provision for alignment or synchronisation of consecutive frames, but which overcomes the above noted problem of 'bit-stuffing'.

The concept of the system of the invention is to achieve synchronisation using a pattern or code sequence spread over a number of frames. Achieving frame synchronisation can be achieved in software by storing multiple frames of data and searching for the pattern or code sequence. No modification to the frame contents are required. The approach also lends itself to simple hardware implementation if data rates dictate. It provides a simple to implement, low overhead, method of frame synchronisation for frames carrying random lengths of data and control information.

The system of the invention does not require special flag patterns at the beginning and end of a frame, with associated 'bit-stuffing' techniques, since by locating the code sequence spread over a number of frames, and knowing the position of the sequence within each frame, it is possible to synchronise received stored frames, and then to decode their contents. It is possible arbitrarily to increase the accuracy of synchronisation by increasing the number of frames used in the synchronisation process, and/or increasing the length of the sequence parts in each frame.

The sequence is preferably a count value which is incremented from frame to frame. Patterns other than count values may be employed, for example, each frame may contain a section of a pseudo random code, which code is known to the receiver. A plurality of received frames permit the complete pseudo random code to be built up and synchronisation to be made.

Thus, the present invention provides, in a first aspect, a data communication system comprising a transmitter and receiver, the transmitter being arranged transmit data as a sequence of frames, each frame comprising a synchronisation section and a payload section of data, and the transmitter including means for including in the synchronisation section of each frame a part of a predetermined code sequence, wherein successive frames contain other parts of the predetermined code sequence, and the receiver including means for storing a predetermined number of received frames, and means for assessing the stored data within the frames in order to locate and recognise the predetermined code sequence parts, whereby to synchronise to the received frames.

In a further aspect, the invention provides, in a data communication system, a receiver for receiving a sequence of frames, each frame comprising a synchronisation section and a payload section, the synchronisation section including part of a predetermined code sequence, successive frames containing other parts of the code sequence, the receiver including means for storing a predetermined number of received frames, and including means for assessing the stored data within the frames in order to locate the predetermined code sequence parts, so as to recognise the code sequence and to synchronise to the received frames.

In a further aspect, the invention provides a protocol for a data communication system, comprising:

determining a code sequence and forming a plurality of code sequence parts, transmitting a sequence of frames, each frame including a synchronisation section and a payload section of data, the synchronisation section including a said code sequence part, and wherein a succeeding frame includes a different code sequence part in its synchronisation section, and receiving the sequence of frames, storing a plurality of frames and assessing the stored frames to locate the code sequence parts within each frame, and relating the located code sequence parts with one another to recognise the predetermined code sequence, whereby to synchronise to the frames.

In a still further aspect, the invention provides a method of synchronising received frames of data, wherein each frame includes a synchronisation section and a payload section of data, the synchronisation section including a part of a predetermined code sequence, wherein succeeding frames contain different parts of the predetermined code sequence, the method comprising receiving the frames and storing a predetermined number of the frames, and assessing the frames to locate the code sequence parts within each stored frame, and relating the code sequence parts with one another to recognise the predetermined code sequence, whereby to synchronise to the frames.

In accordance with the invention, "synchronisation" is used in the sense of the receiver being synchronised to the incoming frames of data, to enable successful reception and decoding of the frames.

As preferred, the synchronisation section also includes an indication of the length of the payload section in the case where the payload is variable.

As preferred, the synchronisation part and the payload part are arranged as a byte or bytes of data. Preferably, the synchronisation part comprises a single byte of data, a plurality of bits thereof forming the pattern part and a further plurality of bits forming the payload length indication.

As preferred, the predetermined sequence is a sequential binary count, and each sequence part is one count value.

Whilst the number of received frames used in frame synchronisation can be of any number, the preferred number is 3, as a compromise between accuracy and complexity of synchronisation.

BRIEF DESCRIPTION OF THE DRAWINGS

A preferred embodiment of the invention will now be described with reference to the accompanying drawings, wherein.

DESCRIPTION OF THE PREFERRED EMBODIMENT

In a preferred embodiment information is transferred serially with the data organised in a byte-orientated fashion. However, the same synchronisation scheme could be used on serial data in any format. Since data is organised in bytes, some external method of identifying byte synchronisation is necessary. For example, RS232 uses start and stop bits to identify the start and end of a character and UARTs detect the presence of these bits.

A frame consists of a synchronisation byte, and one or more payload bytes. The length of the payload is unimportant, although increasing the payload length improves the efficiency of the frame structure albeit at the expense of increasing the buffer size required at the receiver. An important feature of the preferred embodiment is that the synchronisation byte contains a count value (coded sequence or pattern part) that is incremented as each frame is transmitted. The length of the count can be kept reasonably short allowing other bits in the synchronisation byte to be used to transfer flag bits associated with the frame (for example length, or payload content). A preferred synchronisation byte is shown below:

| 1 | N1 | N0 | C/S | C3 | C2 | C1 | C0 |
|---|---|---|---|---|---|---|---|

Where:
C0–C3 is the synchronisation frame counter
C/S indicates the contents of the control/status word
N0–N1 indicates the number of data bytes in the frame Key elements of any frame synchronisation strategy are the way in which initial synchronisation can be achieved, how it is maintained and how loss of frame synchronisation can be recovered.

Figure 1:
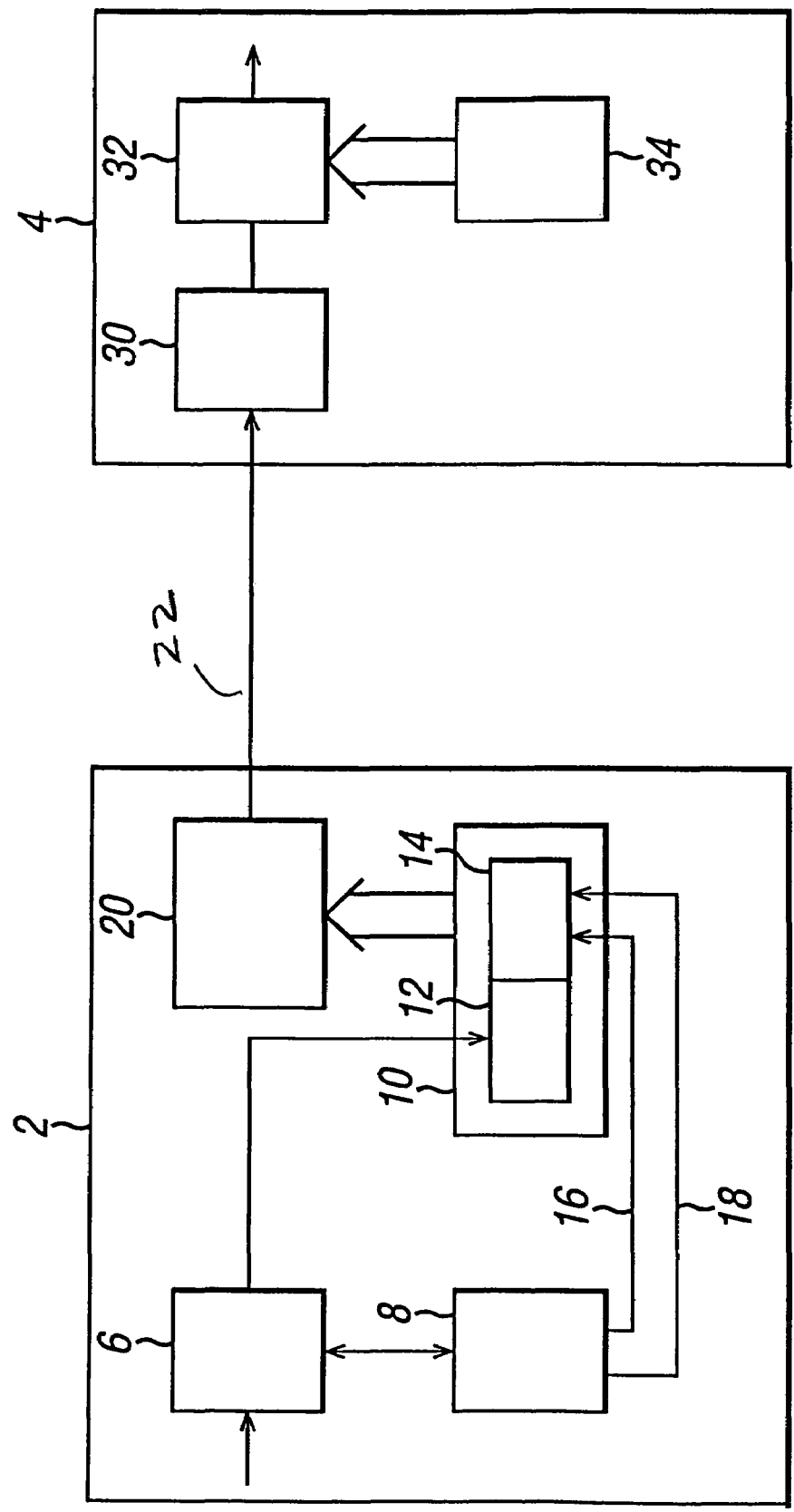
FIG. 1 is a schematic view of a data communication system according to the invention.

Referring now to FIG. 1, there is shown a transmitter 2 and a receiver 4, in accordance with the preferred embodiment of the invention. Transmitter 2 includes a memory 6 for storing incoming data, and a processor 8 for sending the data in payload sections to a frame assembly unit 10. A frame is schematically shown in unit 10 as comprising a payload section 12 and a synchronisation section 14. Processor 8 provides an indication of the length of the payload data as at 16 to unit 10, and processor 8 provides a count value as at 18 to unit 10 for synchronisation section 14. Each count value $C_0$–$C_3$ is four bits long and defines one part of an overall code sequence, the overall code sequence being the total number of count values provided in the four bit count. Data is transmitted in parallel format to a UART 20, which converts the data to serial from and transmits it across a serial RS-232 link 22 to receiver 4.

The receiver section 4 includes a UART 30, a FIFO buffer 32 (which may be part of the UART) for receiving and storing incoming frames of data, and a processor 34 for assessing the data and locating the code sequence parts in order to recognise the overall code sequence.

Figure 2:
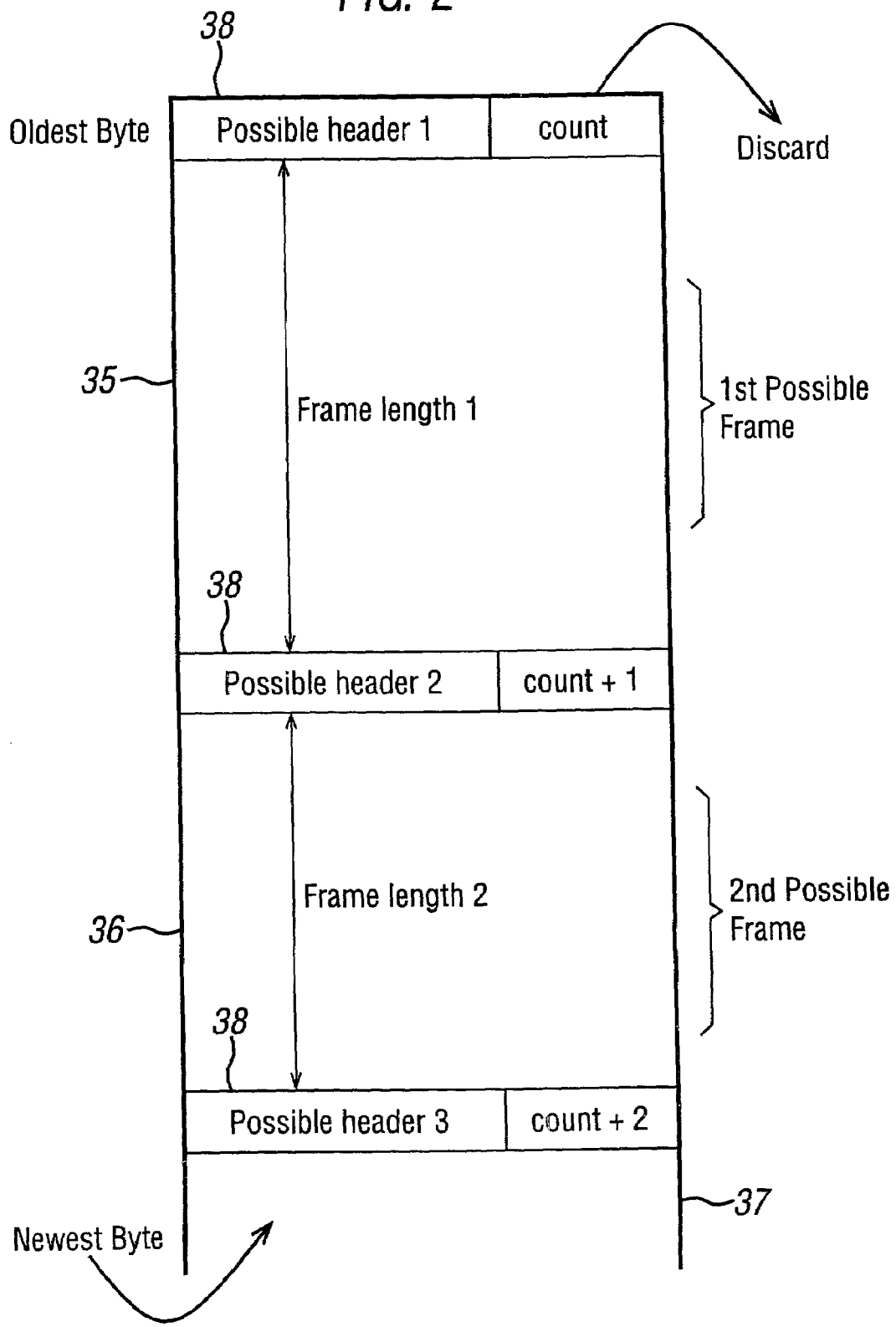
FIG. 2 is a schematic view of frames stored in the receiver of FIG. 1.

The FIFO, and buffer 32 is shown in more detail in FIG. 2. The buffer stores three frames 35–37, as indicated in FIG. 2, starting with the oldest byte in the FIFO, the means 34 looks at the three bytes 38 that would be in the corresponding position in each frame (i.e.—separated by the length of a frame above and below the start position in the FIFO). The frame length is calculated as a precise value from the bits N0–N1, which indicates the number of data bytes in the frame. If the three bytes contain three consecutive count values, then the frame boundary has been identified and synchronisation achieved.

If the frame synchronisation process fails, then the 'top' byte in the FIFO is discarded and the next byte from the stream is inserted at the base of the FIFO. The synchronisation process is then repeated.

As with any frame synchronisation process, the probability of false synchronisation must be considered. With this scheme, the probability of false synchronisation can be controlled by either varying the length of the counter used (for example, by using fixed length frames and using the frame length bits to extend the counter field), or by changing the number of frames used in the synchronisation process.

Once initial synchronisation has been achieved, the synchronisation can be confirmed if necessary by checking the indication in each synchronisation part of the number of data bytes in the frame so that the frame length of each frame is confirmed.

Once initial synchronisation has been achieved, frame decoding can start. As each frame is read out from the 'top' of the FIFO, another frame is inserted into the bottom of the FIFO. Before a frame is read, the count values in the synchronisation bytes are compared to ensure that synchronisation has not been lost. At any stage, if the three synchronisation bytes do not contain consistent count values then this indicates that synchronisation has been lost and error recovery must be performed.

Error recovery may be necessary to re-establish frame synchronisation in the event of the loss of one or more bytes on the interface. Error recovery is simply a repeat of the initial synchronisation process. Once synch is lost, as each new byte is received into the bottom of the FIFO buffer, the oldest byte is discarded and the synchronisation process is repeated.

Figure 3:
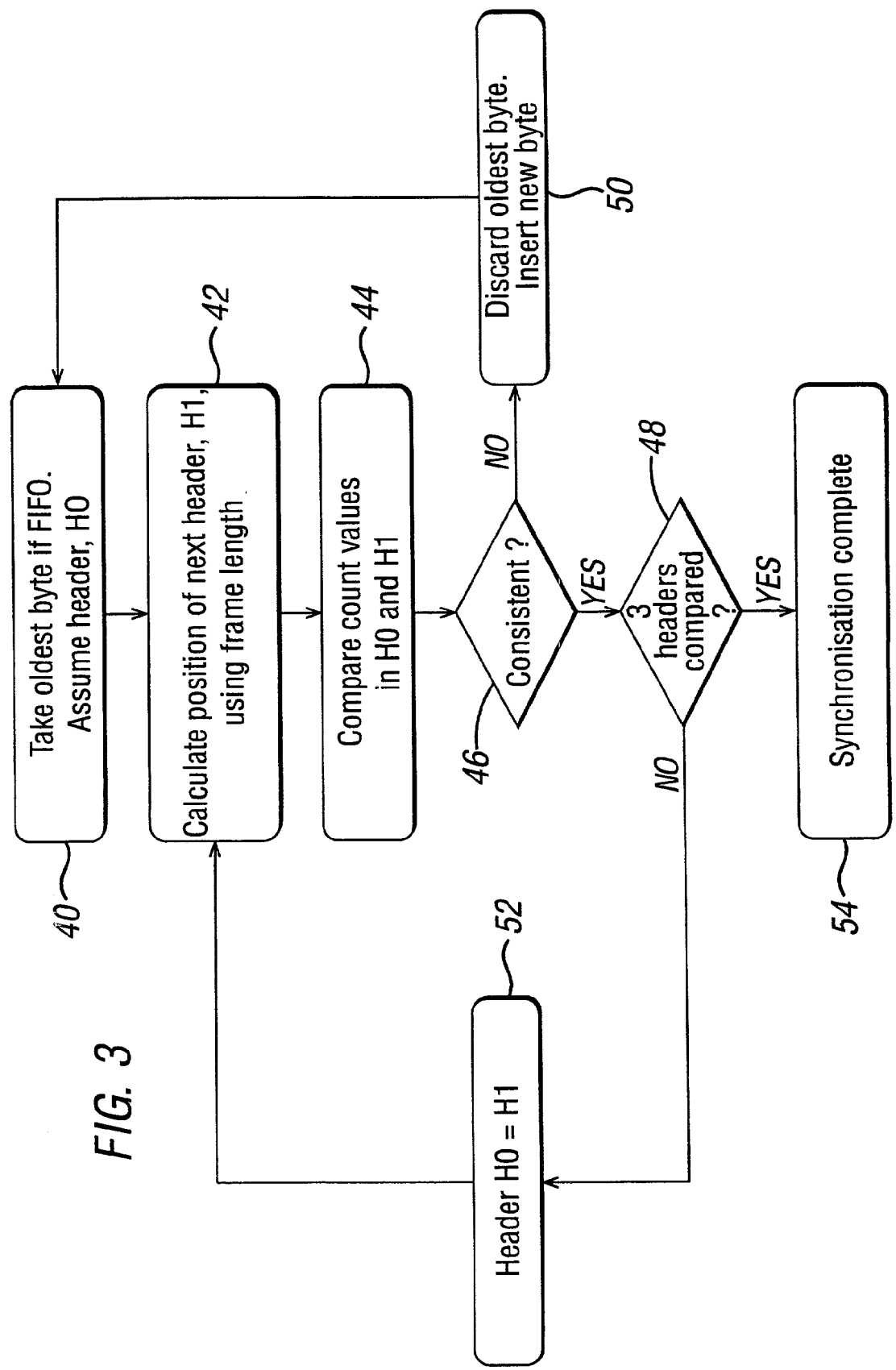
FIG. 3 is a flowchart of the means for assessing the stored data in the receiver.

The synchronisation process is illustrated in FIG. 3. Processor 34 reads the oldest byte in the FIFO, as at 40. It assumes that this is a synchronisation section and that the various bits in the byte correspond to the number of data bytes in the frame and the code sequence part, or synchronisation frame count. At 42, processor 34 calculates from this assumed data, the position of the header H1, or synchronisation section, for the next frame. At 44, processor 34 takes the first byte, or synchronisation section for the next frame and compares the synchronisation count values. If these are consistent, by which is meant that the count value of H1 is one more than the count value in H0, as at decision point 46, then processor 34 proceeds to decision point 48 where it determines whether three consecutive headers have been compared successfully.

If at decision point 46, the count values are not consistent, then the oldest byte in FIFO buffer 32 is discarded, and a new byte is inserted into the buffer (50). Processor 34 then returns to step 40, to repeat the steps 40–46. If at decision point 48, processor 34 has not as yet successfully compared three successive frames then steps 42–48 are repeated with the next header or synchronisation section (52). When three successive synchronisation sections or headers have been successfully compared, with their count values consistent, then processor 34 proceeds to step 54 where the synchronisation is complete.

It will be understood that various modifications may be made to the above described preferred embodiment of the invention. A counter is probably the simplest form of embedded sequence or pattern that can be used to provide synchronisation. Other sequences, for example pseudo-random could be used.

If a short synchronisation count is used (for example, 4 bits as shown above) together with fixed length frames, then the remainder of the synchronisation byte could be used for error protection of the synchronisation count, making the scheme more robust to link errors.

What is claimed is:

1. A data communication system comprising a transmitter and receiver, the transmitter being arranged to prepare and transmit data as a sequence of frames, each frame comprising a synchronisation section and a payload section of data, and the transmitter including means for including in the synchronisation section of each frame a part of a predetermined code sequence comprising four bits, wherein successive frames contain other parts of the predetermined code sequence and the receiver including means for storing a predetermined number of received frames, and means for assessing the stored data within the frames in order to locate and recognise the predetermined code sequence parts, whereby to synchronise to the received frames.

2. In a data communication system, a receiver for receiving a sequence of frames, each frame comprising a synchronisation section and a payload section, the synchronisation section including part of a predetermined code sequence comprising four bits, successive frames containing other parts of the code sequence, the receiver including means for storing a predetermined number of received frames, and including means for assessing the stored data within the frames in order to locate the predetermined code sequence parts, so as to recognise the code sequence and to synchronise to the received frames.

3. A system or receiver according to claim 1, wherein the predetermined code sequence is a sequence of count values, and the sequence part within each synchronisation section is a single count value, successive frames having successive count values.

4. A system according to claim 1, which is a serial communication system.

5. A system or receiver according to claim 1, wherein the synchronisation section is constituted by a byte of data.

6. A system or receiver according to claim 1, wherein the synchronisation section includes an indication of the length of the payload data.

7. A system or receiver according to claim 1, wherein the predetermined sequence is a pseudo-random sequence.

8. A system or receiver according to claim 1, wherein the receiver includes a FIFO buffer for storing a predetermined number of frames.

9. A protocol for a data communication system, comprising:

determining a code sequence and forming a plurality of code sequence parts, transmitting a sequence of frames, each frame including a synchronisation section and a payload section of data, the synchronisation section including one of said code sequence parts, which comprises four bits, and wherein a succeeding frame includes in its synchronisation section a different code sequence part of the plurality of code sequence parts, and receiving the sequence of frames, storing a plurality of frames and assessing the stored frames to locate the code sequence parts within each frame, and relating the located code sequence parts with one another to recognise the predetermined code sequence, whereby to synchronise to the frames within the receiver.

10. A method of aligning or synchronising received frames of data, wherein each frame includes a synchronisation section and a payload section of data, the synchronisation section including a part of a predetermined code sequence comprising four bits, wherein succeeding frames contain different parts of the predetermined code sequence, the method comprising receiving the frames and storing a predetermined number of the frames, and assessing the frames to locate the code sequence parts within each stored frame, and relating the pattern or code sequence parts with one another to recognise the predetermined code sequence, whereby to synchronise to the frames.

11. A protocol or method according to claim 9, wherein the receiver assesses an initial byte in the stored data and, assuming this to be a synchronisation section, compares it with the assumed synchronisation section of the next byte, and compares the respective code synchronisation parts, which if consistent, synchronisation is assumed, and if not consistent, the initial byte is discarded and the next byte is assumed as the synchronisation section of the first frame.

12. A protocol or method according to claim 9, wherein three successive frames are compared before synchronisation is completed.

13. A protocol or method according to claim 9, wherein the synchronisation sections contain an indication of the respective length of payload data, and this indication is employed to calculate the position of the next synchronisation section in the stored data.

14. A protocol or method according to claim 9, wherein the predetermined code sequence is a sequential count, said code sequence parts being individual count values.

15. A protocol or method according to claim 9, wherein if, subsequent to frame synchronisation, frame synchronisation is lost, then the protocol or method according to any of claims 9–14 is repeated.

16. A protocol or method according to claim 9, wherein upon initial synchronisation, in order to reduce the probability of false synchronisation, fixed length frames are used.

17. A protocol or method according to claims 9, wherein upon initial synchronisation, in order to reduce the probability of false synchronisation, the code sequence parts are extended in length.

18. A data communication system, comprising:
   a transmitter arranged to prepare and transmit data as a sequence of frames, each frame comprising a synchronisation section and a payload section of data;
   a frame assembly unit, which assembles in the synchronisation section of each frame a part of a predetermined code sequence comprising four bits, wherein successive frames contain other parts of the predetermined code sequence;
   a receiver including a buffer, which stores a predetermined number of received frames; and
   a processor, which assesses data within the stored frames and which locates and recognises the predetermined code sequence parts to synchronise to the received frames.

* * * * *